United States Patent [19]

Javerzat et al.

[11] 3,931,879

[45] Jan. 13, 1976

[54] AUTOMATIC DEVICE FOR SYSTEMATICALLY PLACING ELONGATED PRODUCTS ON A CONVEYOR

[75] Inventors: Alex Javerzat, St Nazaire; Fernand Delplanque, Nice, both of France

[73] Assignee: Mecaval International, Saint Chamond, France

[22] Filed: Nov. 9, 1973

[21] Appl. No.: 414,296

[30] Foreign Application Priority Data
May 30, 1973 France.......................... 73.19951
Aug. 11, 1972 France.......................... 72.29386

[52] U.S. Cl. .................... 198/21; 198/34; 198/94; 198/31 AC
[51] Int. Cl.² ........................................ B65G 47/08
[58] Field of Search ......... 198/31 R, 31 AC, 34, 37, 198/27, 21, 86, 94, 99, 106, 76, 20 R; 214/1 QG

[56] References Cited

UNITED STATES PATENTS

| | | | |
|---|---|---|---|
| 2,736,417 | 2/1956 | Greer | 198/31 AC |
| 2,850,141 | 9/1958 | Bishop et al. | 198/37 |
| 2,883,033 | 4/1959 | Armstrong et al. | 198/31 AC |
| 2,950,815 | 8/1960 | Oberg | 198/189 X |
| 2,965,213 | 12/1960 | Kugler | 198/21 |
| 3,019,882 | 2/1962 | Pearson | 198/34 |
| 3,075,630 | 1/1963 | Fisk | 198/76 |
| 3,108,677 | 10/1963 | Temple | 198/21 |
| 3,173,557 | 3/1965 | Eliassen | 198/31 R |
| 3,189,160 | 6/1965 | Holland, Jr. | 198/34 |
| 3,456,775 | 7/1969 | Stubbins et al. | 198/34 |
| 3,464,481 | 9/1969 | Hartzell | 198/34 |
| 3,583,554 | 6/1971 | Hartzell | 198/34 |
| 3,605,981 | 9/1971 | Danieli | 198/27 |
| 3,648,861 | 3/1972 | Fabian et al. | 198/34 |
| 3,690,435 | 9/1972 | King | 198/20 R |
| 3,804,228 | 4/1974 | Felstehausen | 198/31 AB |

FOREIGN PATENTS OR APPLICATIONS 1,033,281  6/1966  United Kingdom.................. 198/37

Primary Examiner—Evon C. Blunk
Assistant Examiner—Richard K. Thomson
Attorney, Agent, or Firm—Miller, Frailey & Prestia

[57] ABSTRACT

An automatic device for systematically placing elongated products, such as pieces of sectional iron, bars, or the like, on a roller conveyor, said device having a scraper remote from the conveyor for providing storage for a plurality of such elongated products, a pusher for advancing the products from storage in a direction transverse to their longitudinal axes to a feeding device, said feeding device having its longitudinal axis parallel to the axes of the rollers of the roller conveyor, means for depositing the elongated products on the feeding device one at a time, at uniformly spaced intervals, to provide on the feeding device a layer of elongated products disposed in uniformly spaced, parallel relation, means for advancing transversely the layer of elongated products on the feeding device to the roller conveyor and means automatically operative for delivering the elongated products, in selected quantities, from the feeding device to the roller conveyor.

12 Claims, 4 Drawing Figures

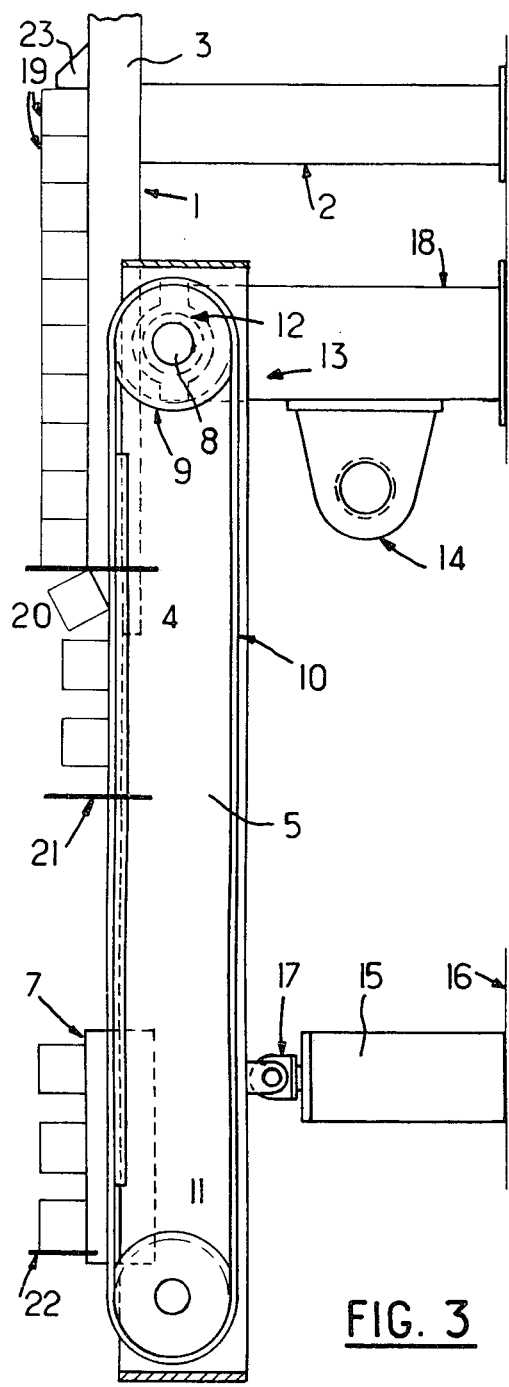
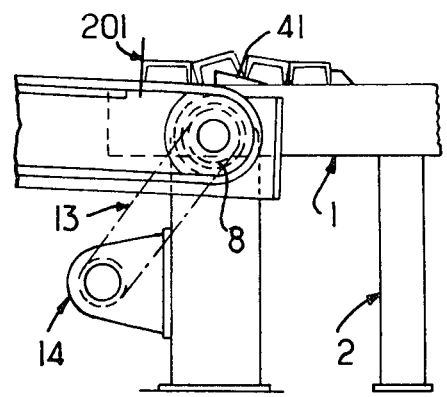
FIG. 3
FIG. 4

AUTOMATIC DEVICE FOR SYSTEMATICALLY PLACING ELONGATED PRODUCTS ON A CONVEYOR

The present invention relates to an automatic device for spreading out, on a conveyor belt, elongated products such as pieces of sectional iron or especially bars, previously placed on a scraper, that is to say a device which arranges the said products parallel to each other and in a side-by-side arrangement on a single bed, in such a manner that they are a definite distance from one another, which distance may be zero, and wherein the said pieces of sectional iron are pushed laterally and deposited on a conveyor by which they are then carried in the direction of their axes.

This operation of distributing pieces on a conveyor is currently being utilized in industries which treat pieces of sectional iron, especially for pre-heating, granulating and painting, and is now carried out in the following ways:

manually, by a group of workers carrying each piece and depositing it in a parallel relationship to the others on a conveyor, for example, at a definite distance from one another, the conveyor displacing the products in a parallel fashion along their axes.

semi-automatically, by an operator actuating a plurality of scrapers at once by acting as a controller; in this case, the operator "calls" each piece of sectional iron one by one, in order to arrange them in a parallel manner on the conveyor at a definite distance from each other; the operation is executed by sight, and the judgment of the operator is necessary for each displacement of the sectional iron.

In the two preceding cases, the operation takes a long time to effectuate, leaving it to the initiative of the workers or of the operator; the space between the pieces of sectional iron is estimated by sight; therefore it is without precision and the parallelism of the sectional pieces is not exact. These drawbacks are detrimental, for example, to the quality of the subsequent treatments, such as granulation, painting, etc., and to the timing of production.

The present invention has for its object to remedy these various disadvantages in carrying out the operation automatically.

The apparatus of the invention is characterized principally by the fact that the sectional iron pieces are pushed by the scraper, step by step, at a certain speed, in a manner to arrange them one by one on at least two arms which extend in the direction of the scraping, the said arms each being supplied with a transfer means which is continuously displaced in the same direction and at the same speed as the device which pushes the scraper during the time necessary to lay out a pattern in which the products are separated the desired distance from each other, the said pieces then being deposited during a subsequent stoppage of the transfer apparatus, on some conveyor rollers which are arranged between the transfer means with their axes parallel to the direction of advancement of the said transfer means, the deposition of the pieces being executed by lowering the transfer means below the horizontal line of the uppermost part of the rollers, whereas previously the said transfer means was above the highest part of the rollers, the sequences of movement are synchronized and controlled by product position detectors which send signals to an electrical controller which actuates the different movements of the components of the apparatus.

In order to achieve this result, arms provided with transfer means are pivoted near the scraper, and they oscillate vertically under the influence of a jack in such a manner that their free ends can rise with the transfer means above the horizontal line of the rollers of the conveyor, and can descend with the transfer means below the horizontal line of the conveyor.

One can improve the contact of the products with the transfer means by pre-gauging the downstream extremity of the scraper with the anticipated incline for depositing the products delicately on the transfer means which are, of preference, of the chain type, with two wheels at each extremity of the arm, one of the wheels being driven by a reducing motor.

The following description gives a non-limiting example of the apparatus of the invention, which is illustrated by the attached illustrations, in which:

FIG. 3 is an elevational view of the apparatus at the moment when a new group of spaced bars is in preparation and/or the preceding group is deposited on the conveyor, and FIG. 4 is a similar view to FIG. 2, showing a variant of the device.

Figure 1:
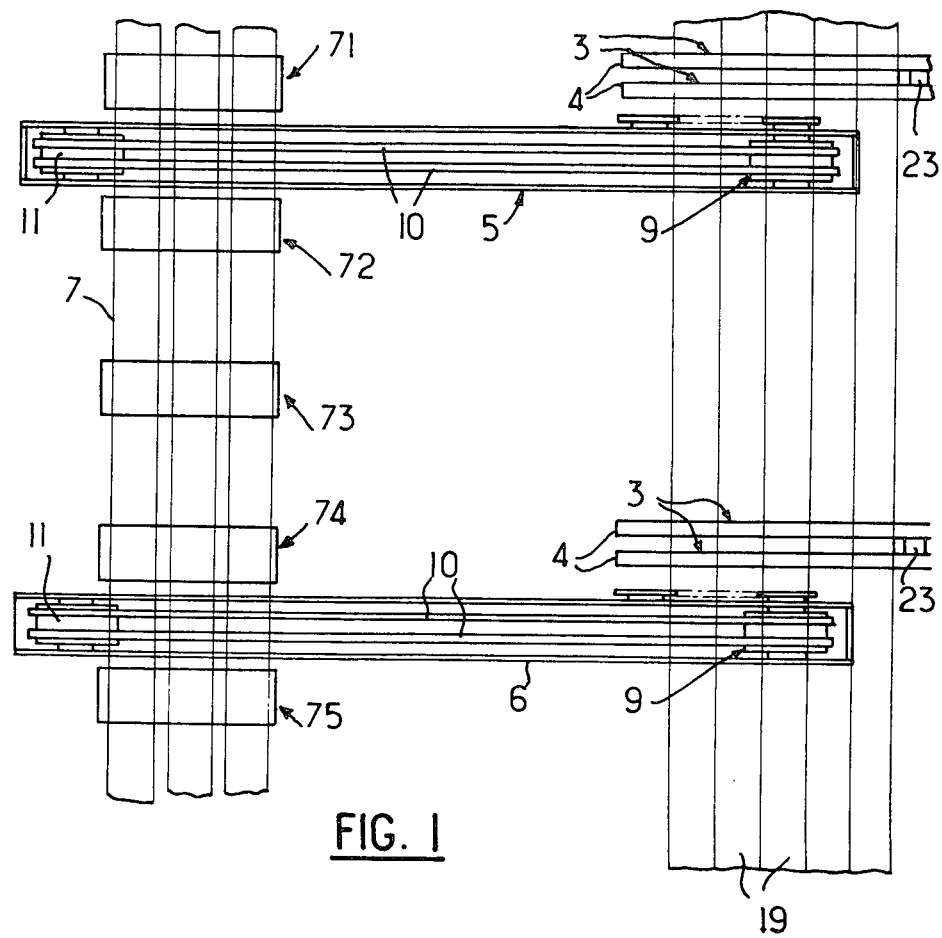
FIG. 1 is a view in plan of the apparatus.

The device includes the scraper 1, mounted on a support 2, and having guide rails 3 each ending at a ramp 4.

It also includes spaced arms 5, 6 and a roller conveyor 7 having longitudinally spaced rollers 71, 72, 73, 74, 75.

The arms such as 5 are pivoted around an axis 8, which is also the axis of a chain pulley 9 of a chain conveyor 10, which turns around a pulley 11. The chain pulley 9 is driven by a toothed-wheel 12, a chain 13, and a reduction motor 14. The vertical oscillation of the arm is actuated by a jack 15 which is supported on the ground 16 and is linked to the arm by the lug 17. The spaced arms 5, 6 and spaced conveyor chains 10 comprise elements of a feeding device, the longitudinal axis of which is transverse to the longitudinal axis of the roller conveyor 7.

Figure 2:
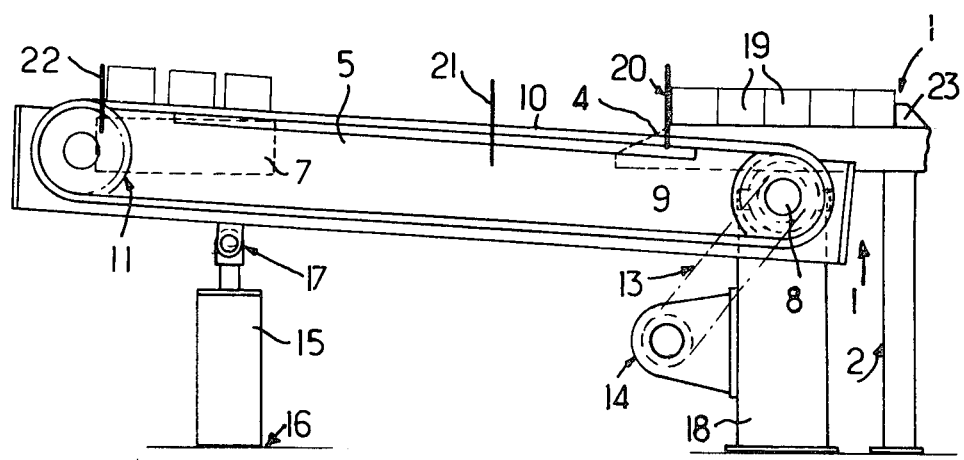
FIG. 2 is an elevation view of the apparatus at the moment when a group of spaced bars is being prepared by the arm to descend onto the conveyor.

The jack 15 can assume either the lowered position shown in FIG. 3 where the upper links of the transversely spaced chains 10 are positioned below the upper horizontal line of the conveyor rollers 7, or the position of FIG. 2 in which the jack 15 is extended and the transversely spaced arms 5, 6 raised so that the upper links of chains 10 are positioned above the horizontal line of the upper-most part of the conveyor rollers 7. The arm 5 is supported on one side of the axis 8, by the support 18.

The scraper 1 supports the sectional iron or bars 19 which are displaced on the rails 3 by means of a pusher carriage 23.

The position of the sectional iron 19 is detected, at the discharge side of the scraper 1 by the detector 20; it is detected on the arm 5 by the intermediate detector 21, and at the extremity of the arm 5, at the edge of the conveyor 7, by the detector 22. These detectors are simple feelers which function on the principle of magnetic induction.

The scraper 1 comprises at least two series of rails 3 and at least two arms such as 5 or 6 for supporting the sectional iron or bars 19 at at least two points. The arm 5 and the group of rails 3, with all their depending accessories, constitute a unity. The automatic conveying device generally includes a plurality of units, depending upon the length of the pieces being handled. The units are tied together by an electric and electronic control unit, not shown, and which is not a part of this invention, according to which the operator starts or stops the automatic cycle of the formation pattern and obtains the desired space between two products, a space which is determined by the detectors, as will be described hereinafter.

According to a variant (FIG. 4) the ramp 41 is arranged at an upward incline from scraper 1, and the location of detector 201 is displaced farther back on the arms 5 and 6. Furthermore, the scraper 1 is lowered in relation to the position that it had previously, in order that its horizontal line be practically the same as that of the upper-most part of arms 5 and 6. The surface of ramp 41 is roughened in a manner to brake the sectional iron 19. This variant is an improvement because of the fact that the sectional irons 19 are arranged rigorously parallel to each other on the chains 10.

In the case of the first version (FIGS. 1, 2 and 3) the operation of the device is as follows:

The products 19 being arranged in a single layer on the rails 3:

1. The products 19 lying on the rails 3 are pushed by the pusher carriage 23 at a determined speed, and step by step, at a rate which corresponds to each division of the sectional iron 19. Simultaneously, the chains 10 are started at a speed Vo which is identical to the speed of advancement of the pusher carriage 23.

2. The first sectional bar 19 which makes contact with detector 20 activates the latter and sends a signal to the control box. The products on the rails 3 continue to advance at the speed Vo and the first sectional bar 19 is inclined and slides on the ramp 4 to come into contact with chain 10 of arm 5.

3. The detector 20 feels the rear edge of the first sectional bar 19 which sends a signal to the control box which stops the pusher carriage 23 during an instant of time T, which is a function of the interval between two products of the pattern being formed, this inverval having been determined by the operator of the control box. During this time, the chain 10 continues to advance at the speed Vo.

4. At the end of the interval of time T, the pusher carriage 23 starts again to carry the products on the rails 3 at the speed Vo, and the cycle which was described in paragraphs 2 and 3 above, commences again. This thus continues until the contact with the detector 21 sends a signal to the control box which, in turn, determines the elevation of arm 5 by means of the jack 15.

5. The arm 5, covered with the sectional bars 19, is in an elevated position, the chain 10 is speeded up at a speed Vl which is faster than V0 (of the order of 2V0), until the detector at the end 22 is actuated by the first bar 19. The detector 22 then causes the chain 10 to stop in such a way that the sectional iron is placed conveniently above the conveyor 7, and permits the lowering of arms 5 by means of the jack 15, and thus loads the conveyor 7.

6. The cycle can then be carried out again, either by the intervention of the operator of the control box, or automatically.

The function of the variant device according to FIG. 4 differs clearly from the function which was described above, as follows:

The products 19 being arranged in a single bed on the rails 3:

1. The products 19 lying on the rails 3 are pushed by the pusher carriage 23 at a determined speed and step by step at a value corresponding to each section 19. Simultaneously, the chain 10 of the arm 5 is started at a speed Vo which is identical to the advancement speed of the pusher carriage 23.

2. The first sectional bar 19 which comes into contact with detector 201 sets the latter in motion and sends a signal to the control box, stopping the pusher carriage 23 during an instant of time T which is a function of the width of the product and of the space between two products in the pattern formed, this interval having been determined by the operator of the control box. During this time, the chain 10 continues to advance at the speed Vo. 3. At the end of the period of time T, the pusher carriage 23 starts again to carry the products on the rails 3 at the speed Vo, and the cycle which was described in paragraphs 1 and 2 above starts again. It continues until the contact with the detector 21 sends a signal to the control box, which in turn, determines the elevation of arm 5 by means of the jack 15.

4. The arm 5 covered with the sectional bar 19 is in a raised position, the chain 10 moves at the speed Vl which is faster than Vo (of the order of 2Vo), until the end detector 22 is actuated by the first sectional bar 19. This detector 22 thus causes the stoppage of the chain 10 and permits the lowering of arm 5 by means of jack 15, and thus loads conveyor 7.

5. The cycle can then be carried out again, either by the operator of the control box, or automatically.

The following is claimed:

1. In a device for placing elongated products, such as pieces of sectional iron, bars or the like, on a conveyor formed of longitudinally spaced rollers, said device having storage means for a plurality of such elongated products remote from the roller conveyor and a feeding device intermediate the roller conveyor and the storage means for advancing the products to the roller conveyor, said feeding device having a longitudinal axis transverse to the longitudinal axis of the roller conveyor and at least two transversely spaced longitudinally extending product transfer means,
 a. a pusher for advancing the products from storage to the feeding device, said pusher being operable to advance the products in a direction transverse to their longitudinal axes at a selected rate of speed,
 b. drive means for advancing the product transfer means of the feeding device at the same selected rate of speed at which the pusher advances the products from storage,
 c. means for depositing the elongated products transversely on the feeding device transfer means one at a time at uniformly spaced time intervals, to provide on the transfer means as it advances a transverse layer of elongated products disposed in uniformly spaced parallel relation,
 d. means automatically operable for transferring periodically selected quantities of the elongated products from the layer of products on the transfer means to the roller conveyor, while maintaining the uniformly spaced parallel relation of the elongated products, said automatic means including i. actuating means for raising the feeding device to a position above the upper plane of the roller conveyor and for lowering the feeding device to a position below the upper plane of the roller conveyor and ii. detector means on the feeding device to cause the actuating means to raise and lower the feeding device in response to the advancement of the layer of elongated products, said detector means being operable to cause the feeding device to be moved to its lower position to deposit elongated products on the roller conveyor, and to cause the feeding device to be moved to its upper position subsequent to the deposit of elongated products on the roller conveyor.

2. Device as defined in claim 1, characterized by the fact that the feeding device is pivoted close to the storage means, and is pivotal vertically under the influence of a jack whereby its distal end may be disposed selectively above and below the upper plane of the roller conveyor.

3. Device as defined in claim 1, characterized by the fact that the means for depositing the elongated products on the feeding device transfer means one at a time includes product positioning means operable to deposit the two extremities of each elongated products simultaneously on the transfer means.

4. Device as defined in claim 3, characterized by the fact that said product positioning means includes braking surfaces for braking the advance of the elongated products from storage to the feeding device, whereby the products advance only under the force of the pusher.

5. Device as defined in claim 4, characterized by the fact that the braking surfaces are rough surfaces.

6. Device as defined in claim 4, characterized by the fact that the braking surfaces are constituted by rising ramps.

7. Device as defined in claim 4, characterized by the fact that the braking surfaces are constituted by a rising ramp whose surface is rough.

8. Device as defined in claim 1, characterized by the fact that the transfer means is of the chain type, with toothed-wheels at each extremity of the feeding devices, one of these wheels being connected to a drive motor.

9. Device as defined in claim 1, characterized by a. means for operating the pusher intermittently, for advancing the products from storage one at a time, b. product positioning means operative to deposit the two extremities of each elongated product simultaneously on the feeding device transfer means and c. the means for depositing the elongated products on the feeding device transfer means one at a time includes product position detector means automatically operative to deactivate the pusher for a selected interval of time.

10. Device as defined in claim 1, characterized by the fact that the detector means are of the magnetic type.

11. Device as defined in claim 1, characterized by three separate product position detector means associated with the feeding device transfer means, said separate detector means comprising a. a first detector means associated operatively with the pusher to deactivate the pusher temporarily following deposit of an elongated product on the feeding device transfer means, b. a second detector means operative to control the actuating means to raise the feeding device as the transfer means advances the layer of products toward the roller conveyor and c. a third detector means disposed in the proximity of the roller conveyor and operative to deactivate the feeding device transfer means and to lower the feeding device to deliver a selected quantity of elongated products to the roller conveyor.

12. Device as defined in claim 11, characterized by the second detector means being operative to increase the speed of the transfer means to increase the rate of advance of the layer of products to the roller conveyor.

* * * * *

UNITED STATES PATENT OFFICE
CERTIFICATE OF CORRECTION

PATENT NO. : 3,931,879
DATED : January 13, 1976
INVENTOR(S) : Alexandre Javerzat and Fernand Delplanque It is certified that error appears in the above-identified patent and that said Letters Patent are hereby corrected as shown below:

Page 1, line 75, change "Alex" to --Alexandre--

Column 4, line 20, begin a new paragraph with "3. At the end of the period ..."

Column 6, line 4, change "vices" to --vice--

Signed and Sealed this twenty-fifth Day of May 1976

[SEAL]

Attest:

RUTH C. MASON
Attesting Officer

C. MARSHALL DANN
Commissioner of Patents and Trademarks